United States Patent
Vietoris

(10) Patent No.: US 7,464,810 B2
(45) Date of Patent: Dec. 16, 2008

(54) PLATE-LINK CHAIN

(75) Inventor: Aurel Vietoris, Bühl (DE)

(73) Assignee: Luk Lamellen und Kupplungsbau Beteiligungs KG, Bühl (DE)

(*) Notice: Subject to any disclaimer, the term of this patent is extended or adjusted under 35 U.S.C. 154(b) by 0 days.

(21) Appl. No.: 11/801,991

(22) Filed: May 11, 2007

(65) Prior Publication Data

US 2007/0272523 A1 Nov. 29, 2007

Related U.S. Application Data

(60) Provisional application No. 60/800,992, filed on May 17, 2006.

(30) Foreign Application Priority Data

May 11, 2006 (DE) .................. 10 2006 021 879

(51) Int. Cl.
*B65G 17/06* (2006.01)
(52) U.S. Cl. ........................ 198/850; 198/853
(58) Field of Classification Search .......... 198/850–853
See application file for complete search history.

(56) References Cited

U.S. PATENT DOCUMENTS

| 4,074,085 | A | * | 2/1978 | Russell ................ 369/44.37 |
| 4,458,809 | A | * | 7/1984 | White et al. ................ 198/790 |
| 5,176,246 | A | * | 1/1993 | Wiggers et al. ............ 198/790 |
| 5,906,267 | A | * | 5/1999 | Heit et al. ............. 198/781.05 |
| 6,308,823 | B1 | * | 10/2001 | Stevens ...................... 198/853 |
| 2005/0230294 | A1 | * | 10/2005 | Seidl .......................... 198/850 |

FOREIGN PATENT DOCUMENTS

DE 100 22 844 A1 11/2000

* cited by examiner

*Primary Examiner*—James R. Bidwell
(74) *Attorney, Agent, or Firm*—Alfred J. Mangels

(57) ABSTRACT

A plate-link chain made up of a plurality of parallel plates arranged in rows extending in the running direction of the chain. The plates form chain links that are connected to adjacent chain links at a hinge joint. Elastically deformable damping plates extend parallel to the plates and interconnect adjacent chain links with each other elastically to allow bending movement of the chain as it passes around a wheel. The damping plates serve to damp strand vibrations that develop in the chain strand that extends between pulleys or gears about which the chain passes.

21 Claims, 5 Drawing Sheets

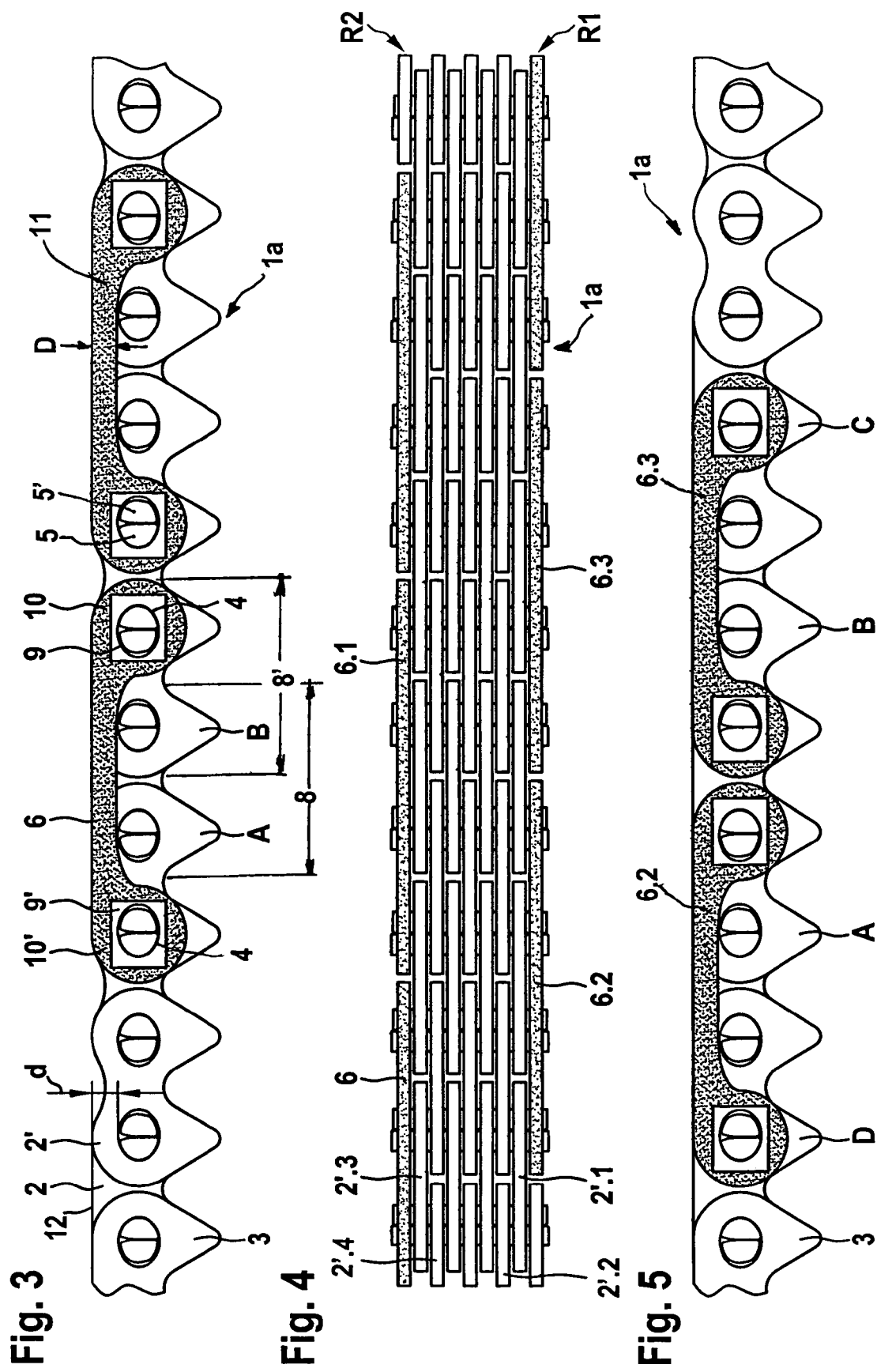

PLATE-LINK CHAIN

BACKGROUND OF THE INVENTION

1. Field of the Invention

The present invention relates to a plate-link chain made up of a plurality of plates that form chain links, which are hingedly connected to adjacent chain links.

2. Description of the Related Art

A plate-link chain of the general form involved is shown in, for example, DE 100 22 844 A1. With plate-link chains of that type, the problem arises that when the chain passes around conical pulleys, toothed wheels, friction wheels, or the like, strand vibrations can occur. Chain strand vibrations come about through introduction of force into the chain links as the chain runs onto or off of, for example, the sprocket wheel of an inverted-tooth chain drive or the conical pulley of a CVT (continuously variable transmission). The impact of the tooth flanks in combination with the polygon effect of the link chain excites the chain strand to vibrate. A similar effect occurs in CVT chains between the rocker pressure member end faces and the conical pulleys.

Hence the vibration problem occurs both with plate-link chains and with toothed plate-link chains, and also with drive belts, or the like. If the excitation frequencies coincide with the natural frequencies of the strand vibrations in belt or chain drives of that type, resonance produces relatively high vibration amplitudes.

Many attempts have been made in the existing art to suppress the strand vibrations, such as by means of sliding rails or the like, for example. In DE 100 22 844 A1, on the other hand, the proposal is made to provide individual chain links with a plastic coating on their side facing the connecting pins or rocker pressure members, with the intention of bringing about damping through relative motion with respect to the rocker members.

A disadvantage of the solution in accordance with the existing art is the relatively complicated structure of the coated chain links, as well as the danger of abrasion at the respective contact points.

An object of the present invention is therefore to provide a plate-link chain that is of simple construction and that also results in reliable damping of strand vibrations.

SUMMARY OF THE INVENTION

The object is achieved by a plate-link chain made of a plurality of plates that form chain links, each of which is hingedly connected to an adjacent link. The plate-link chain includes damping plates that connect two adjacent chain links with each other elastically with reference to a bending motion. As used herein, the term plate-link chain also includes a toothed plate-link chain. The bending motion is a rotation of two adjacent chain links relative to each other around the hinge joint that connects the two links, for example when the chain passes around a toothed wheel, a friction wheel, a conical pulley, or the like, as shown in FIG. 1 of DE 100 22 844 A1, for example. Such a buckling or bending motion is possible in the circular direction, and in particular also in the opposite circular direction thereby affecting both strands of the chain during operation.

Preferably, the design in accordance with the present invention provides for the damping plates to damp the bending of the plate-link chain in at least one direction. Thus only one of the two possible directions of bending is damped. Preferably, the damping is brought about by an elastic deformation of the damping plates. It is also possible for only partial areas of the damping plates to be deformed. Preferably, the design provides for each of the damping plates to extend over two adjacent chain links. In that case the pitch of the damping plates is twice as long as that of the link plates.

At least one row of damping plates is situated in the plate-link chain. Preferably, the design provides for two rows of damping plates to be situated in the plate-link chain. In that case the two rows are preferably laterally situated at an offset from each other. The damping plates, each of which covers two link plates, are therefore not situated so that their coverage is the same when viewed from the side, but rather so that they overlap.

Preferably, the design also provides for the two rows of damping plates to form end plates of the plate-link chain. End plates are the plates situated at the outside on both sides of the plate-link chain. Preferably the design provides for the damping plates of the one row to damp the bending motion of the chain in the one bending direction, and for the damping plates of the other row to damp the bending motion in the other direction. The two rows have different damping plates for that purpose. Alternatively, there can be provision for the two rows to have the same damping plates. The damping plates are then preferably oriented differently.

Preferably, the design provides for the damping plates to include two lugs, which are joined to each other with a single back. The lugs preferably surround the two outer pins in the running direction of two adjacent chain links. That results in a maximum possible construction length of the damping plates in the running direction of the chain. The back can include two arched back parts. That arrangement is particularly advantageous if the back is located on the inner side of the pins or rocker members when passing around a pulley, a friction wheel, a toothed wheel, or the like. Preferably, the design provides for the back to be situated on the side facing an axis of rotation of a chain wheel or friction wheel when the plate-link chain is in its installed position. In the case of a toothed plate-link chain, the back is preferably situated on the side of the pins that faces the teeth.

In another preferred embodiment of the invention there is provision for the damping plates to form a strand of plates. The strand of plates can be produced in a single piece, and possibly as an endless ribbon, for example. Preferably, the strand of plates is symmetrical in reference to an axis of symmetry lying in the running direction of the chain. The strand of plates preferably has one locking point. Preferably, the design provides for the plate-link chain to include two strands of plates and for the locking points of the two strands of plates to be situated at an offset from each other in the running direction of the chain. The problem noted at the beginning is also solved by a damping plate for use in a plate-link chain in accordance with the invention.

BRIEF DESCRIPTION OF THE DRAWINGS

The structure, operation, and advantages of the present invention will become further apparent upon consideration of the following description, taken in conjunction with the accompanying drawings in which:

FIG. 3 is a side view of a first exemplary embodiment of a plate-link chain in accordance with the present invention;

FIG. 4 is a top view of the plate-link chain shown in FIG. 3;

FIG. 5 is an opposite side view of the plate-link chain shown in FIG. 3;

DESCRIPTION OF THE PREFERRED EMBODIMENTS

Figure 1:
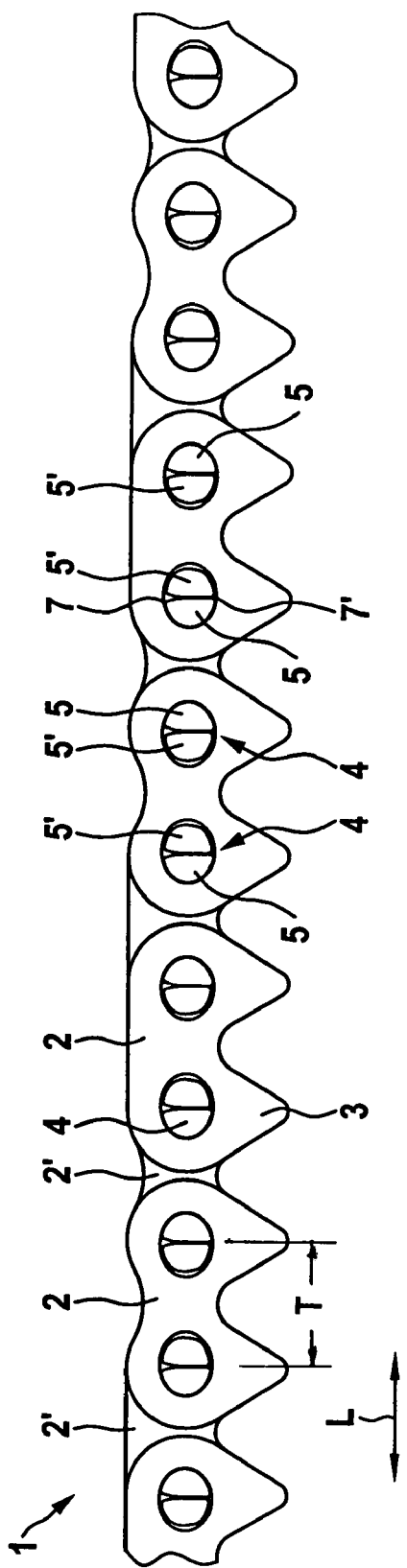
FIG. 1 is a side view of a known plate-link chain having groupings of two plates.
Figure 2:
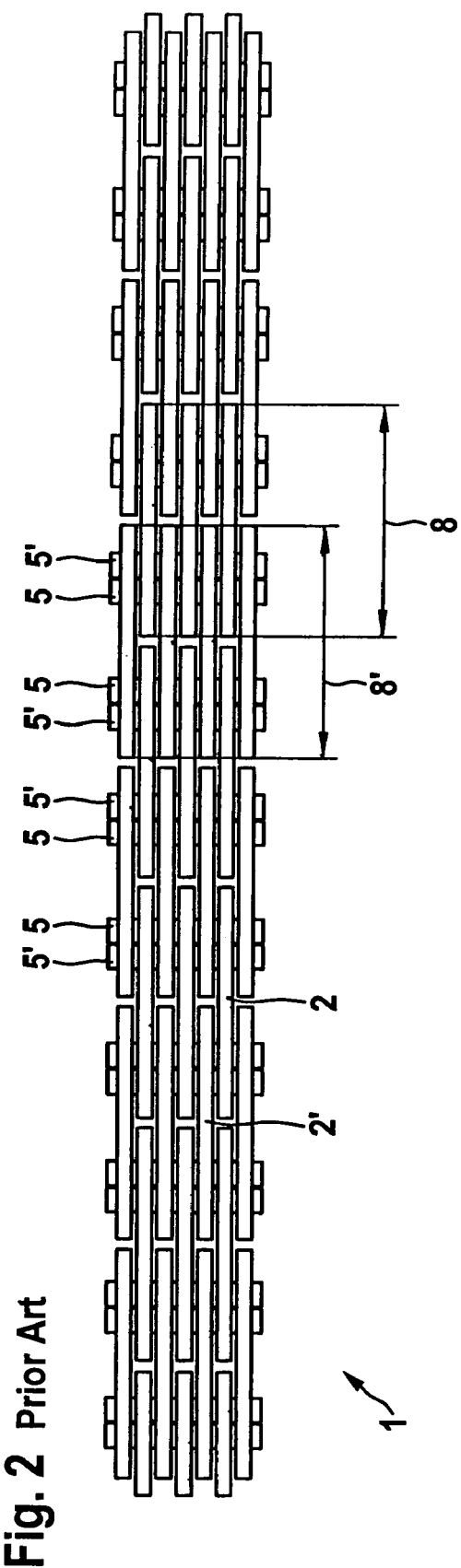
FIG. 2 is a top view of the plate-link chain shown in FIG. 1.

FIG. 1 shows a side view and FIG. 2 a top view of a known toothed plate link chain, with groupings of two plates. The basic construction of plate-link chains and toothed plate-link chains and the terms used in the exemplary embodiments in accordance with the invention will be explained on the basis of FIGS. 1 and 2. The exemplary embodiments will be described using the example of a plate-link chain having two-plate groupings, but are equally applicable to a plate-link chain having three-plate groupings. Plate link chain 1 includes a large number of plates 2 and 2'. Plates 2 and 2' are arranged alternately overlapping, and are combined into a joint with joint pins 4. Both ends of a plate 2 are consequently joined with one or two plates 2' by means of a joint. The joint pins 4 can be in one piece, but are preferably in two pieces, with a rocker member 5 being associated with each of the plates and rolling on a rocker member 5' associated with an adjacent plate 2'. In addition, rocker members 5, 5' each have a roller profile 7 and 7', respectively, with which they can roll or slide on each other. The roller profiles 7, 7' can be identical or different. Stacked transversely to the running direction L, which is identified with an arrow with the reference L, are the plates 2 and 2', so that a plate 2, 2' is situated in overlapping position between two joint pins 4 which are situated next to each other transversely to the running direction L. Of course that does not apply to the plates 2 and 2', which are located on the outside transversely to the running direction 2; these have a neighbor on only one side. The chain links formed of plates 2, 2' in that way (also referred to as plate stacks) form a chain link 8 or 8' as a package. The plates 2 and 2' in the present exemplary embodiment are identical parts; only by the arrangement is any there any difference to be recognized between plates 2 and 2', so that reference will be made henceforth only to plates 2. FIG. 2 shows chain links each having three plates 2 and five plates 2'; but it is also possible to provide chain links here with any other number of plates 2 and 2'.

Between the centers of rotation of the joint pins 4 or of the rocker members 5 and 5' rolling or sliding on each other, there is in each case a distance T, which is referred to as the pitch of the plate-link chain or toothed plate-link chain. Represented pictorially, the distance T designates the length of a straight segment that is formed from one of the chain links 8 or 8' when a chain is bent.

In the case of a toothed plate-link chain, the plates 2 are each provided with plate teeth 3, as can be seen in FIG. 1. On a plate-link chain, the plate teeth 3 are absent. With the plate teeth 3, plate link chain 1 can mesh with a toothed part, for example a gear wheel. The pitch between plates 2 and 2' is designed so that when the chain is extended a uniform pitch results overall between the plate teeth 3. The plates 2 and 2' are provided with plate teeth 3, so that all of the plates and opposing plates are provided with plate teeth 3. But it is likewise also possible to provide either only plates 2 or opposing plates 2' with two plate teeth 3, or to provide plates and opposing plates each with only one plate tooth 3. The chain links are completed on both sides by damping plates 6. For the sake of clarity, the toothed plate-link chain in accordance with FIGS. 1 and 2 is shown without damping plates.

FIGS. 3 through 5 show an exemplary embodiment of a toothed plate-link chain in accordance with the invention. It includes chain links 8 and 8' corresponding to the showing in FIGS. 1 and 2. In addition, chain links 8 and 8' are provided with damping plates 6. The damping plates 6 complete the chain links 8 and 8' to the side. The pitch of the damping plates 6 is twice that of the chain links 8 and 8'. To make that easier to understand, in the following figures two chain links 8', which are connected with a damping plate 6, are singled out and designated with the letters A and B.

The damping plates 6 each connect two adjacent chain links 2' in such a way that the respective outer joint pins 4 or rocker members 5, 5' are encompassed by a bore 9 or 9' of the damping plate 6. The damping plates form two rows of plates situated one behind the other in the running direction L, as can be seen in FIG. 4; these are labeled R1 and R2. The term rows of plates is used here to mean the plates situated adjacent to each other in the running direction of the chain. The damping plates 6 have in addition a lug or eyelet 10 or 10' at each of their two ends in the form of loops having openings to receive the bores 9 and 9'. The two lugs 10, 10' are connected to each other with a back 11 having a thickness D, which corresponds approximately to the distance d between a chain top edge 12 and the surface of the pins 4 or pressure pieces 5, 5' facing the chain top edge 12. In that way, the damping plates do not extend beyond the chain top edge 12. Alternatively, however, the design can also provide for the thickness D of the backs 11 to be greater than the distance d, so that the damping plates 6 extend beyond the top edge of the chain. The damping plates 6 are of an elastically flexible material, at least between the lugs 10, 10', so that when the chain 1 bends it is also possible for chain link A to bend with respect to chain link B.

To enable elastic deformation of the damping plates 6, they can be made for example entirely out of an elastic material, for example rubber or a composite material, for example a rubber sheathed with steel. But alternatively, some areas of the damping plates 6 can be made of different materials; the lugs 10, 10' for example are not deformed when the chain bends, and can be made of a less elastic material, for example steel; the back 11 is deformed when the chain 1 bends, and can be made for example of a rubber-steel composite material. But it is also possible to use suitable fully synthetic materials or synthetic composite materials for the damping plates 6. FIG. 4 shows a top view of the chain 1 shown in side view in FIG. 3. As can be seen, the damping plates 6 are positioned alternately on both sides in such away that they overlap each other by pairs. A damping plate 6.1 on the one side of the chain 1 is overlapped halfway for example by damping plates 6.2 and 6.3 on the other side of chain 1 in the running direction of chain 1. So while on the side of the chain shown in FIG. 3 chain links A and B are connected with damping plate 6, on the other side chain link B is connected with adjacent chain link C and chain link A is connected with adjacent chain link D. So chain links 8, 8' lying side-by-side are connected alternately with each other on both sides. In that way the additional stiffness of the chain 1 against bending of the chain links 8, 8' relative to each other caused by the damping plates is constant over the length of the chain. So in the exemplary embodiments in accordance with FIGS. 3 through 5 the damping plates 6 are installed at an offset from each other, in order to realize uniform coverage of all rocker joints that are formed by the pairs of rocker members 5, 5'. That offset installation of the damping plates 6 can occur at the sides of the chain, as shown in the exemplary embodiment in FIGS. 3 through 5, or at any desired locations within the chain. For example, the damping plates 6 can be situated between the rows of plates 2 and 2' designated as 2'.1 and 2'.2 or 2'.3 and 2'.4.

Figure 6:
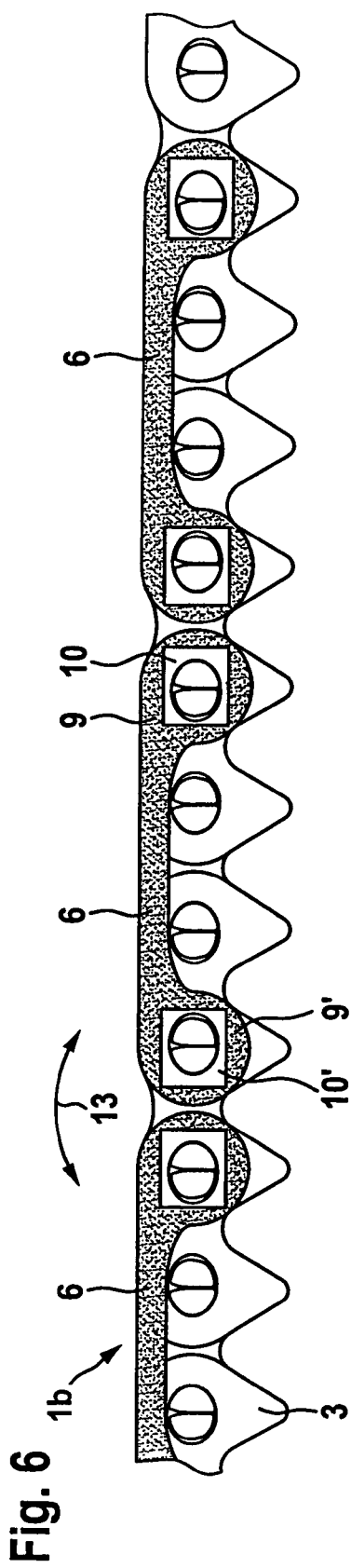
FIG. 6 is a side view of a second exemplary embodiment of a plate-link chain in accordance with the present invention.
Figure 7:
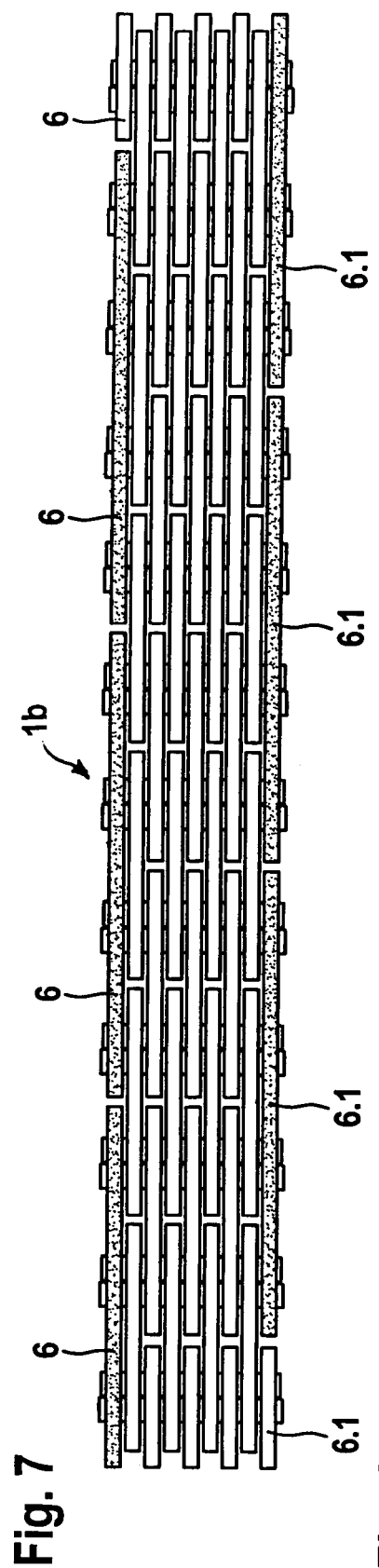
FIG. 7 is a top view of the plate-link chain shown in FIG. 6.
Figure 8:
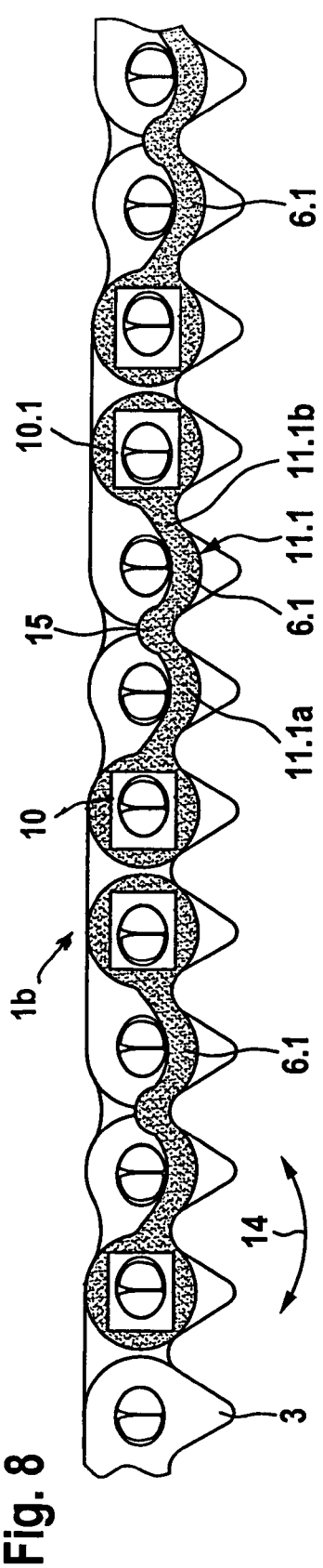
FIG. 8 is an opposite side view of the plate-link chain shown in FIG. 6.

FIGS. 6 through 8 show an alternate exemplary embodiment of a plate-link chain in accordance with the invention. Here too, to be easier to show and easier to understand, the damping plates 6 are situated on both sides of the chain 1. Damping plates in accordance with FIG. 3 are situated on the one side of chain 1 shown in FIG. 6. Damping plates 6.1, which result in impeding of bending of chain 1 in the other direction of deflection, are situated on the other side of the chain in FIG. 8. While the damping plates 6 on the one side substantially impede the bending direction in accordance with double arrow 13 (that is the bending direction that occurs in operation when encircling a pulley or the like), the damping plates 6.1 substantially impede the opposite bending direction in accordance with double arrow 14 in FIG. 8. Substantially means here that because of a stiffness of the material and a compression of the damping plates 6 and 6.1 that may be necessary, bending is also impeded in the respective opposite direction, i.e. also a bending in the direction of double arrow 14 in the case of the damping plates 6, and also a bending direction in accordance with double arrow 13 in the case of the damping plates in accordance with 6.1.

The damping plates 6.1 in accordance with FIG. 8 have a contour that does not impede meshing with the teeth 3 of plate-link chain 1. The damping plates 6.1 include in addition a back 11.1 that connects the lugs 10, 10.1 with each other, which is situated on the side of the joint pins 4 or rocker members 5, 5' facing the teeth 3. The back 11.1 in turn is divided into two back parts 11.1a and 11.1b, which are of arched design and are connected with each other at a contact point 15. The arched design of the back parts ensures that they do not cover up the free spaces between the teeth 3. Bending is impeded, and hence vibration is damped in both bending directions of the plate-link chain 1, by the different types of damping plates 6 and 6.1 situated on both sides of the plate-link chain 1. Here also, the damping plates 6, 6.1 can be installed between the chain links instead of at the two outer sides of the plate-link chain 1. The free damping plates 6 and 6.1 situated at the outer sides of plate-link chain 1 are overlapped in the running direction of the chain, similar to the arrangement in the exemplary embodiment in accordance with FIGS. 3 through 5.

Figure 9:
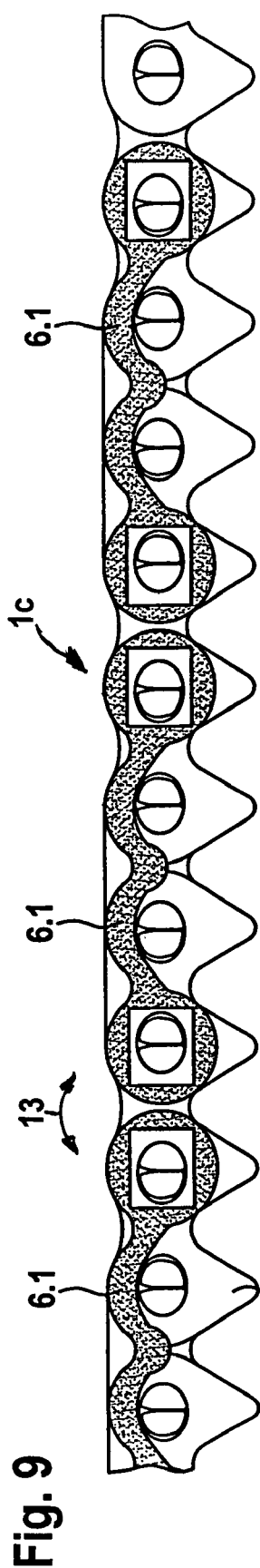
FIG. 9 is a side view of a third exemplary embodiment of a plate-link chain in accordance with the present invention.
Figure 10:
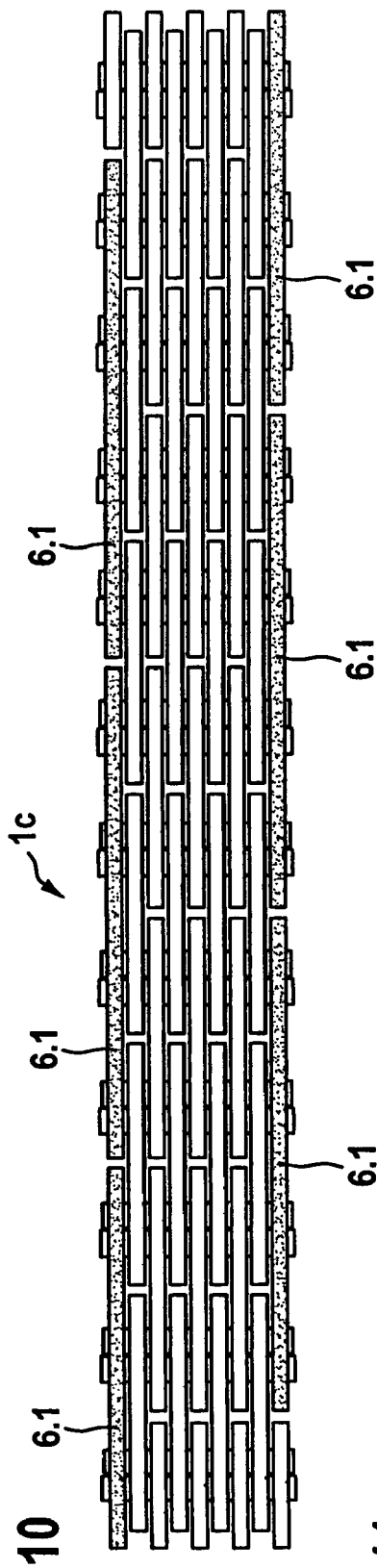
FIG. 10 is a top view of the plate-link chain shown in FIG. 9.
Figure 11:
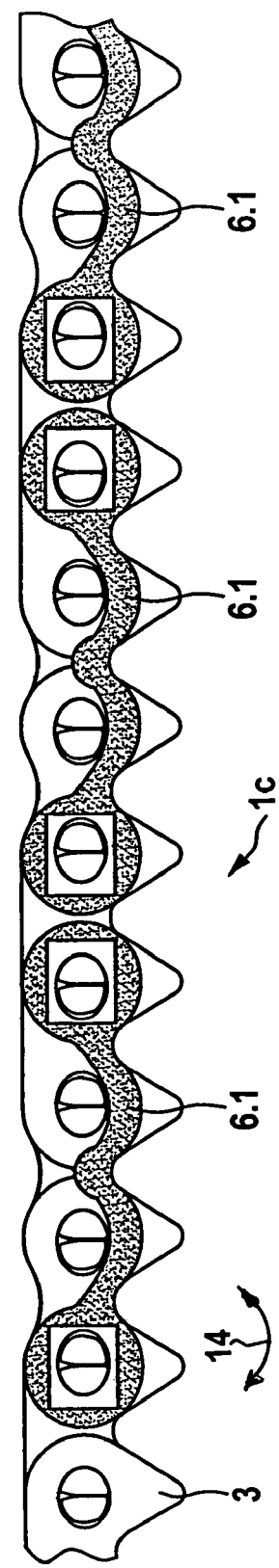
FIG. 11 is an opposite side view of the plate-link chain shown in FIG. 9.

FIGS. 9 through 11 show another exemplary embodiment of a plate-link chain 1 in accordance with the invention. The damping plates 6.1 which are used on only one side in accordance with the exemplary embodiment of FIGS. 6 through 8, as shown in FIG. 8, are used on both sides here, and are installed so that they impede different bending directions of the plate-link chain 1. The damping plates 6.1 shown in FIG. 11 are installed identically to the showing in FIG. 8. On the other side, shown in FIG. 9, the damping plates 6.1 are installed rotated by 180°, so that they have the same effect as the damping plates 6 shown in FIG. 6, namely impeding bending primarily in bending direction 13.

Figure 12:
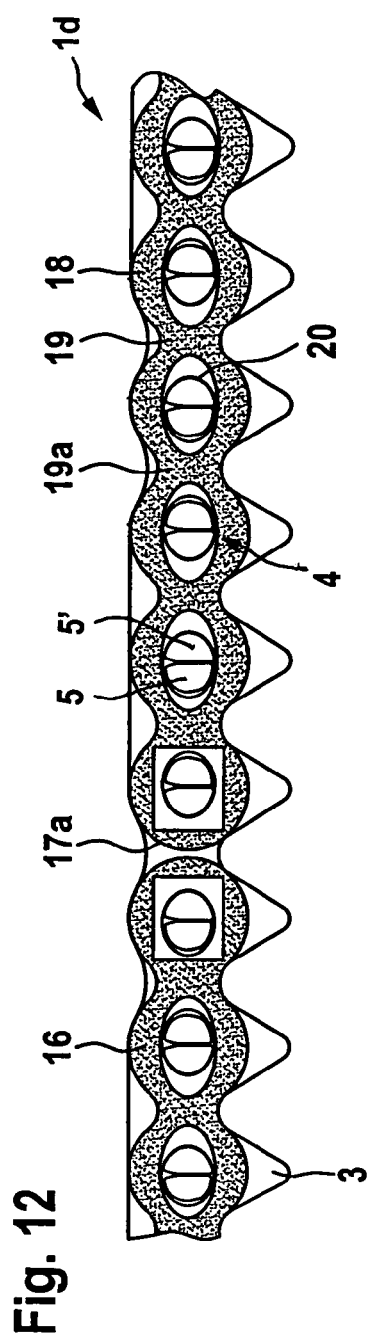
FIG. 12 is a side view of a fourth exemplary embodiment of a plate-link chain in accordance with the present invention.
Figure 13:
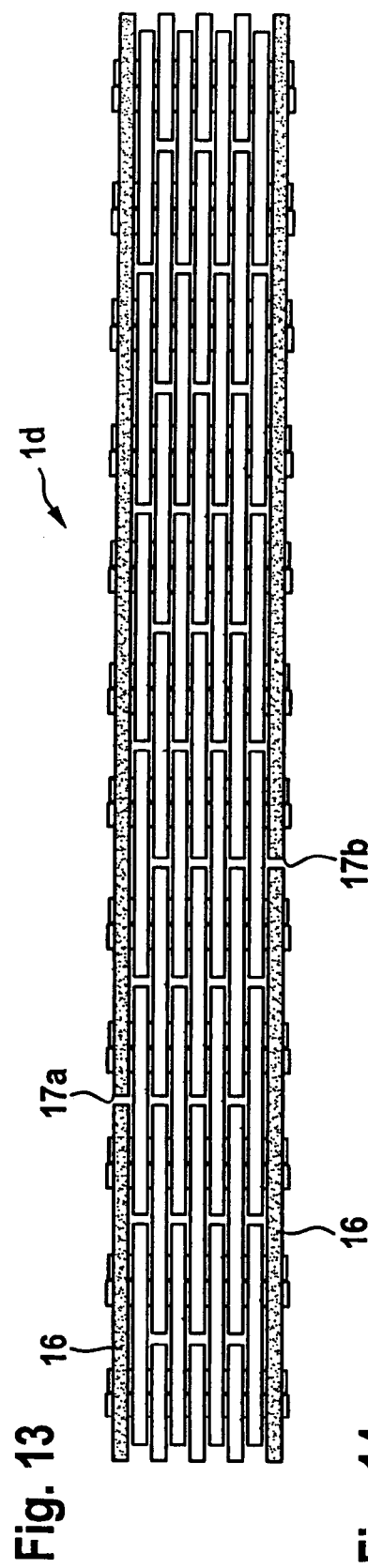
FIG. 13 is a top view of the plate-link chain shown in FIG. 12.
Figure 14:
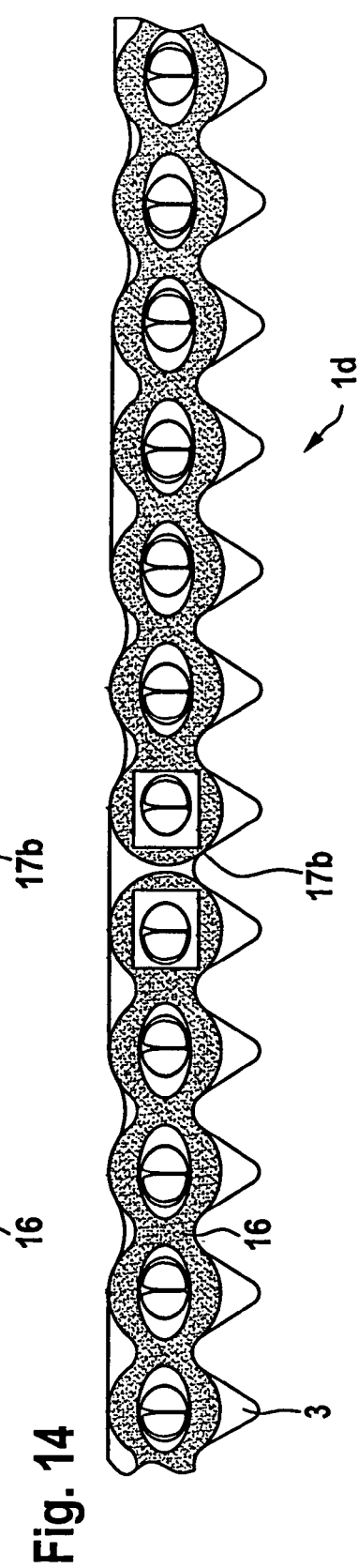
FIG. 14 is an opposite side view of the plate-link chain shown in FIG. 12.

FIGS. 12 through 14 show an additional exemplary embodiment of a plate-link chain in accordance with the invention. The damping plates 6 and 6.1 here are not designed as discrete plates, but instead a strand of plates 16 is used. The strand of plates 16 is situated continuously over the length of the chain and includes a locking point 17a, at which the two ends of the plate strand meet but are not connected with each other. Alternately, provision can also be made for the strand of plates 16 to have its two ends connected at the locking point 17a, for example by vulcanizing, bonding or the like. The strand of plates 16 includes substantially oval plate elements 18, with a bore 20 that is also oval here, with the bore 20 encircling the joint pins 4 or rocker members 5, 5'. The plate elements 18 are joined with each other at connecting points 19, 19a. The plate strand 16 here can be made for example of film material, with two films laid one on top of the other and joined with each other at connecting points 19, 19a. In that way the stand of plates 16 has substantially the same total thickness over its entire length The locking points 17a and 17b of the two strands of plates 16 are situated at an offset from each other, as can be seen from FIGS. 12 through 14.

With the exemplary embodiment in accordance with FIGS. 12 through 14 as well, the plate strands 16 can be situated both at the two sides of the plate-link chain as well as between the individual chain links. It is also possible to use only one strand of plates, instead of two strands of plates. In the exemplary embodiment in FIGS. 12 through 14, a strand of plates 16 is used instead of individual plates. That strand can be mounted along the entire length of the chain, and specifically when used in power dividers can already bring the chain into a shape, for example an oval or circular shape. To that end, the strand of plates already has the corresponding oval or circular shape in the untensioned and non-deformed state.

Through use of the shown plates or strands of plates, the plate-link chain in accordance with the invention exhibits a self-restraint against strand vibrations. The material properties of the elastic plates must be chosen so that they stand up to the ambient conditions of the particular application. Preferably, rubber materials that do not stretch at higher temperatures should be selected. That prevents elongation of the plates and an attendant lessening of the desired effect of strand vibration reduction. The named properties of the strand vibration reduction are ensured even at cold temperatures by selecting appropriate materials; for that reason it is also possible to resort among other things to a mixed construction of the plates of different materials, for example rubber, steel, fiberglass and the like.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain comprising: a plurality of plates arranged in end-to-end and side-by-side relationship, the plates having plate openings for receiving hinge pins; a plurality of hinge pins extending transversely of the plates and received in respective plate openings to form interconnected chain links; wherein the plate-link chain includes damping plates that extend between and join two longitudinally adjacent chain links with each other elastically with respect to a bending motion of the chain relative to axes of the hinge pins, wherein two rows of end-to-end damping plates are positioned in the plate-link chain, and wherein the damping plates of one row damp a bending motion of the chain in a first bending direction and the damping plates of a second row damp a bending motion of the chain in a second direction opposite from the first direction.

2. A plate-link chain in accordance with claim 1, wherein each row of the two rows of damping plates has damping plates of the same configuration.

3. A plate-link chain in accordance with claim 1, wherein vibrations of a chain strand are damped by elastic deformation of the damping plates.

4. A plate-link chain in accordance with claim 1, wherein the damping plates extend over at least two adjacent chain links.

5. A plate-link chain in accordance with claim 1, wherein the two rows of damping plates are positioned at an offset from each other relative to the longitudinal direction of the chain.

6. A plate-link chain in accordance with claim 5, wherein the two rows of damping plates are positioned at respective outer lateral sides of the plate-link chain.

7. A plate-link chain in accordance with claim 1, wherein the damping plates of a row of damping plates are oriented differently from the orientation of the damping plates of another row of damping plates.

8. A plate-link chain comprising: a plurality of plates arranged in end-to-end and side-by-side relationship, the plates having plate openings for receiving hinge pins; a plurality of hinge pins extending transversely of the plates and received in respective plate openings to form interconnected chain links; wherein the plate-link chain includes damping plates that extend between and join two longitudinally adjacent chain links with each other elastically with respect to a bending motion of the chain relative to axes of the hinge pins, wherein two rows of end-to-end damping plates are positioned in the plate-link chain, and wherein each row of the two rows of damping plates is formed by damping plates having a mutually different configuration.

9. A plate-link chain comprising: a plurality of plates arranged in end-to-end and side-by-side relationship, the plates having plate openings for receiving hinge pins; a plurality of hinge pins extending transversely of the plates and received in respective plate openings to form interconnected chain links; wherein the plate-link chain includes damping plates that extend between and join two longitudinally adjacent chain links with each other elastically with respect to a bending motion of the chain relative to axes of the hinge pins, wherein two rows of end-to-end damping plates are positioned in the plate-link chain, and wherein the damping plates include two spaced lugs having openings and that are joined to each other with an interconnecting back member.

10. A plate-link chain in accordance with claim 9, wherein the lugs surround two outermost hinge pins of two adjacent chain links relative to the longitudinal direction of the chain.

11. A plate-link chain in accordance with claim 9, wherein the back members of the damping plates include two interconnected arch-shaped back components.

12. A plate-link chain in accordance with claim 11, wherein the back members are positioned on a side of the chain facing an axis of rotation of a chain-receiving wheel when the plate-link chain is in its installed position.

13. A plate-link chain in accordance with claim 12, wherein the chain is a toothed plate-link chain and the back members are positioned on a side of the hinge pins that faces the chain teeth.

14. A plate-link chain comprising: a plurality of plates arranged in end-to-end and side-by-side relationship. the plates having plate openings for receiving hinge pins; a plurality of hinge pins extending transversely of the plates and received in respective plate openings to form interconnected chain links; wherein the plate-link chain includes damning plates that extend between and join two longitudinally adjacent chain links with each other elastically with respect to a bending motion of the chain relative to axes of the hinge pins, wherein the damping plates damp bending of the plate-link chain In at least one direction about a transverse axis of the chain, and wherein the damping plates are in the form of a strand of plate elements interconnected end-to-end and that extend in a longitudinal direction of the chain.

15. A plate-link chain in accordance with claim 14, wherein at least one strand of end-to-end damping plate elements is positioned in the plate-link chain.

16. A plate-link chain in accordance with claim 14, wherein two strands of end-to-end damping plate elements are positioned in the plate-link chain.

17. A plate-link chain in accordance with claim 14, wherein the strand of plate elements is in a single piece.

18. A plate-link chain in accordance with claim 14, wherein the stand of plate elements is symmetrical with respect to an axis of symmetry that extends in the longitudinal direction of the chain.

19. A plate-link chain in accordance with claim 17, wherein the strand of plate elements has a locking point at its end.

20. A plate-link chain in accordance with claim 19, wherein the chain includes a strand of plate elements along each laterial side of the chain, and the locking points of the two strands of plate elements are positioned at an offset from each other relative to the longitudinal direction of the chain.

21. A plate-link chain in accordance with claim 14, wherein the plate elements are of substantially oval shape and have longitudinal axes that are aligned with each other.

* * * * *